(12) United States Patent
Goto et al.

(10) Patent No.: US 7,581,616 B2
(45) Date of Patent: *Sep. 1, 2009

(54) CONTROL SYSTEM FOR A STEER-BY-WIRE VEHICLE

(75) Inventors: Takeshi Goto, Toyota (JP); Ryuichi Kurosawa, Okazaki (JP); Kenji Tozu, Yokkaichi (JP); Daisuke Yamada, Nagakute-cho (JP)

(73) Assignee: Toyota Jidosha Kobushiki Kaisha, Toyota-shi (JP)

( * ) Notice: Subject to any disclaimer, the term of this patent is extended or adjusted under 35 U.S.C. 154(b) by 414 days.

This patent is subject to a terminal disclaimer.

(21) Appl. No.: 10/585,670

(22) PCT Filed: Dec. 16, 2004

(86) PCT No.: PCT/JP2004/019286

§ 371 (c)(1),
(2), (4) Date: Aug. 16, 2006

(87) PCT Pub. No.: WO2005/066009

PCT Pub. Date: Jul. 21, 2005

(65) Prior Publication Data

US 2008/0251312 A1 Oct. 16, 2008

(30) Foreign Application Priority Data

Jan. 7, 2004 (JP) .............................. 2004-002224

(51) Int. Cl.
*B62D 5/04* (2006.01)
(52) U.S. Cl. ........................................ 180/402; 701/43
(58) Field of Classification Search .................. 180/401, 180/400; 701/41, 42, 43

See application file for complete search history.

(56) References Cited

U.S. PATENT DOCUMENTS

| 5,265,019 A * | 11/1993 | Harara et al. .................. 701/41 |
| 6,173,221 B1 | 1/2001 | Boehringen et al. |
| 6,580,988 B2 * | 6/2003 | Lin et al. ........................ 701/41 |
| 6,655,490 B2 * | 12/2003 | Andonian et al. ........... 180/402 |
| 7,203,582 B2 * | 4/2007 | Yokota ......................... 701/41 |

(Continued)

FOREIGN PATENT DOCUMENTS

DE 196 45 646 C1 2/1998

(Continued)

*Primary Examiner*—Tony H. Winner
(74) *Attorney, Agent, or Firm*—Oliff & Berridge, Plc.

(57) ABSTRACT

In a vehicle steering apparatus of a steer-by-wire system, front wheels are controlled to be turned by a computer program processing. A displacement/torque conversion section 51 converts a steering angle θ into a steering torque Td that is in relation of exponential function. A torque/lateral-acceleration conversion section 52 converts the steering torque Td into an anticipated lateral acceleration Gd (or anticipated yaw rate γd and anticipated turning curvature ρd) that is in relation of exponentiation function and that serves as a vehicle motion state quantity that can be perceived by a human. A turning angle conversion section 53 calculates a target turning angles δd necessary for the vehicle to move with the anticipated lateral acceleration Gd (or anticipated yaw rate γd and anticipated turning curvature ρd). A turning control section 60 controls the steered wheels to be turned into the target turning angle δd. A driver turns the handle, feeling the lateral acceleration, and hence, the driver can easily drive the vehicle.

15 Claims, 7 Drawing Sheets

U.S. PATENT DOCUMENTS

| | | |
|---|---|---|
| 2002/0107621 A1 | 8/2002 | Byers et al. |
| 2003/0055545 A1 | 3/2003 | Uenuma et al. |
| 2005/0209751 A1* | 9/2005 | Kato .......................... 701/41 |
| 2006/0047391 A1* | 3/2006 | Katou .......................... 701/41 |

FOREIGN PATENT DOCUMENTS

| | | |
|---|---|---|
| DE | 102 41 695 A1 | 5/2003 |
| EP | 1 097 855 A2 | 5/2001 |
| EP | 1 228 941 A2 | 8/2002 |
| FR | 2 755 418 A1 | 5/1998 |
| GB | 2 319 007 A | 5/1998 |
| JP | A 4-050077 | 2/1992 |
| JP | A 10-138940 | 5/1998 |
| JP | A-11-059447 | 3/1999 |
| JP | A 11-124047 | 5/1999 |
| JP | A 2000-85604 | 3/2000 |
| JP | A 2001-106103 | 4/2001 |
| JP | A 2001-191937 | 7/2001 |
| JP | A 2002-127919 | 5/2002 |
| JP | A 2003-81111 | 3/2003 |
| JP | A 2004-203072 | 7/2004 |

* cited by examiner

CONTROL SYSTEM FOR A STEER-BY-WIRE VEHICLE

BACKGROUND OF THE INVENTION

1. Field of the Invention

The present invention relates to a vehicle steering apparatus of a steer-by-wire system provided with a steering handle operated by a driver for steering a vehicle, a turning actuator for turning steered wheels and a turning control device that drives and controls the turning actuator according to the operation on the steering handle for turning the steered wheels.

2. Description of the Related Art

The development of the steering apparatus of a steer-by-wire system of this type has recently been carried out positively. For example, the Japanese Unexamined Patent Application No. 2000-85604 discloses a steering apparatus that detects a steering angle and a vehicle speed, calculates a transmission ratio that decreases with the increase in the steering angle and increases with the increase in the vehicle speed, calculates the turning angle (displacement amount of a rack shaft) of a front wheel by dividing the steering angle by this transmission ratio and turns the front wheel into the calculated turning angle. In this steering apparatus, the calculated turning angle is corrected according to the steering speed that is obtained by time-differentiating the detected handle steering angle, thereby enhancing the steering response and tracking performance of the front wheel. Further, a target yaw rate is calculated by using the detected vehicle speed and the detected handle steering angle, and the calculated turning angle is corrected according to the difference between the calculated target yaw rate and the detected actual yaw rate, thereby realizing the turning control considering the vehicle behavior.

The Japanese Unexamined Patent Application No. HEI11 (1999)-124047 discloses a steering apparatus that detects a steering torque and a handle steering angle, calculates two turning angles that increase with the increase in the steering torque and the handle steering angle, and turns the front wheel into the turning angle that is obtained by adding up these calculated turning angles. In this steering apparatus, the vehicle speed is also detected, wherein both turning angles are corrected by this detected vehicle speed, thereby changing the turning characteristic according to the vehicle speed.

The conventional both apparatuses detect the steering angle and steering torque that are operation input values by a driver to a steering handle for steering the vehicle, directly calculates the turning angle of the front wheel by using these detected steering angle and steering torque, and turns the front wheel into the calculated turning angle. However, although the mechanical connection between the steering handle and the steered wheels is unlocked, these turning controls of the front wheel are totally the same in the basic technical concept wherein the turning angle of the front wheel is decided so as to correspond to the steering position and steering force of the steering handle from the viewpoint of a steering method of the front wheel with respect to the operation of the steering handle. The turning angle of the front wheel is not decided so as to correspond to a man's sensory characteristic by these turning methods, so that the driver has a hard time for driving the vehicle.

Specifically, in the conventional apparatuses, the turning angle that cannot be perceived by the driver is directly decided so as to correspond to the operation of the steering handle, and the vehicle is turned by the turning of the front wheel according to the steering angle. The driver has sensed with a sense of touch or sight the lateral acceleration, yaw rate and turning curvature of the vehicle caused by the turn of the vehicle and has fed them back to the operation of the steering handle for turning the vehicle in a desired manner. In other words, the turning angle of the front wheel with respect to the operation of the steering handle by the driver is a physical quantity that a man cannot perceive. Therefore, the turning angle directly decided with respect to the steering operation by the driver is not decided so as to be adapted to the driver's perception characteristic. This makes it difficult for the driver to drive the vehicle.

In the conventional apparatuses, the decided turning angle is corrected according to the difference between the target yaw rate, which is calculated by using the detected vehicle speed and the detected handle steering angle, and the detected actual yaw rate. This is only a correction of the turning angle considering the vehicle behavior, so that the turning angle is not decided according to the yaw rate that the driver is to perceive by the operation of the steering handle. Accordingly, in this case too, the turning angle decided with respect to the steering operation of the driver is not decided so as to be adapted to the driver's perception characteristic, and hence, this makes it difficult for the driver to drive the vehicle.

SUMMARY OF THE INVENTION

In order to cope with the aforesaid problem, the present inventors have grappled with the research of a vehicle steering apparatus that can steer a vehicle according to a man's perception characteristic with respect to an operation of a steering handle by a driver. As for the man's perception characteristic described above, the Weber-Fechner's law states that human sensory amount is proportional to the logarithm of a physical quantity of given stimulation. In other words, if the physical quantity of the stimulation given to a human with respect to the operation amount by the human is changed in the manner of exponential function in case where the operation amount is a displacement, or if the aforesaid physical quantity is changed in the manner of exponentiation function in case where the operation amount is a torque, the relationship between the operation amount and the physical quantity can be adapted to the man's perception characteristic. The present inventors have found the following, as a result of applying the Weber-Fechner's law to a vehicle steering operation.

Upon driving a vehicle, the vehicle turns by the operation on a steering handle. The turn of the vehicle changes vehicle motion state quantity such as the lateral acceleration, yaw rate, turning curvature or the like. The driver senses this vehicle motion state quantity with a sense of touch or sight. Therefore, if the vehicle motion state quantity that a driver can perceive is changed in the manner of exponential function or in the manner of exponentiation function with respect to the operation on the steering handle by the driver, he/she can drive the vehicle by operating the steering handle so as to be adapted to the perception characteristic.

The present invention is based upon the above-mentioned finding, and aims to provide a vehicle steering apparatus wherein a vehicle is steered as adapted to a man's perception characteristic by the operation on a steering handle by a driver, whereby a vehicle is easy to be driven.

In order to attain the foregoing object, the present invention is characterized in that, in a vehicle steering apparatus of a steer-by-wire system provided with a steering handle operated by a driver for steering a vehicle, a turning actuator for turning steered wheels and a turning control device that drives and controls the turning actuator according to the operation on the steering handle for turning the steered wheels, wherein the turning control device comprises: operation input value detecting means that detects an operation input value by a driver to the steering handle; motion state quantity calculating means that calculates an anticipated motion state quantity of the vehicle by using the detected operation input value, wherein the anticipated motion state quantity of the vehicle represents the vehicle motion state, that relates to a turn of the vehicle and can be sensed by a driver, and are in the predetermined relation of exponential function or in the predetermined relation of exponentiation function with the operation input value to the steering handle; turning angle calculating means that calculates a turning angle of the steered wheels necessary for the vehicle to move with the calculated anticipated motion state quantity by using the calculated anticipated motion state quantity; and turning control means that controls the turning actuator according to the calculated turning angle for turning the steered wheels into the calculated turning angle.

In this case, the anticipated motion state quantity is at least one of, for example, a vehicle lateral acceleration, vehicle yaw rate or vehicle turning curvature. In the vehicle steering apparatus, a reaction force device for applying reaction force to the operation of the steering handle may further be provided.

Further, the operation input value detecting means can be composed of a displacement amount sensor that detects a displacement amount of the steering handle. In this case, the motion state quantity calculating means may be composed of operation force conversion means that converts the detected displacement amount into the operation force exerted on the steering handle and motion state quantity conversion means that converts the converted operation force into the anticipated motion state quantity. The operation force conversion means may convert the displacement amount into the operation force that is in the relation of exponential function with the displacement amount, while the motion state quantity conversion means may convert the operation force into an anticipated motion state quantity that is in the relation of exponential function with the operation force.

The operation input value detecting means can be composed of, for example, an operation force sensor that detects the operation force exerted on the steering handle. In this case, the motion state quantity calculating means may be composed of motion state quantity conversion means that converts the detected operation force into the anticipated motion state quantity. The motion state quantity conversion means may convert the operation force into an anticipated motion state quantity that is in the relation of exponentiation function with the operation force.

In the present invention having the aforesaid configuration, the operation input value to the steering handle by the driver is firstly converted into the vehicle anticipated motion state quantity (lateral acceleration, yaw rate, turning curvature, etc.) that relates to a turn of the vehicle, can be sensed by a driver and is in the predetermined relation of exponential function or in the predetermined relation of exponentiation function with the operation input value to the steering handle. Then, the turning angle of the steered wheels necessary for the vehicle to move with the anticipated motion state quantity is calculated based upon the converted anticipated motion state quantity, and the steered wheels are turned into the calculated turning angle. Therefore, when the vehicle turns by the turning of the steered wheels, the anticipated motion state quantity is given to the driver as the "physical quantity of the given stimulation" in accordance with the Weber-Fechner's law. Since the anticipated motion state quantity is changed in the manner of exponential function or in the manner of exponentiation function with respect to the operation input value to the steering handle, the driver can turn the steering handle as perceiving the motion state quantity adapted to a man's perception characteristic. The driver can tactilely sense the lateral acceleration and yaw rate by the contact to each section in the vehicle. The driver can visually sense the turning curvature by the change in the condition within the vehicle view area. As a result, the driver can turn the steering handle for adaptation to the man's perception characteristic, whereby the driver can easily drive the vehicle.

Another feature of the present invention is that, in addition to the aforesaid configuration, the invention is provided with motion state quantity detecting means that detects actual motion state quantity that is the same type of the anticipated motion state quantity and represents the actual motion state of the vehicle, and correcting means that corrects the calculated turning angle according to the difference between the calculated anticipated motion state quantity and the detected actual motion state quantity. This allows the steered wheels to be correctly turned into the turning angle necessary for the vehicle to drive with the calculated anticipated motion state quantity. As a result, the driver can operate the steering handle, while perceiving the motion state quantity correctly adapted to a man's perception characteristic, whereby driving the vehicle is more facilitated.

DESCRIPTION OF THE PREFERRED EMBODIMENTS

First Embodiment

Figure 1:
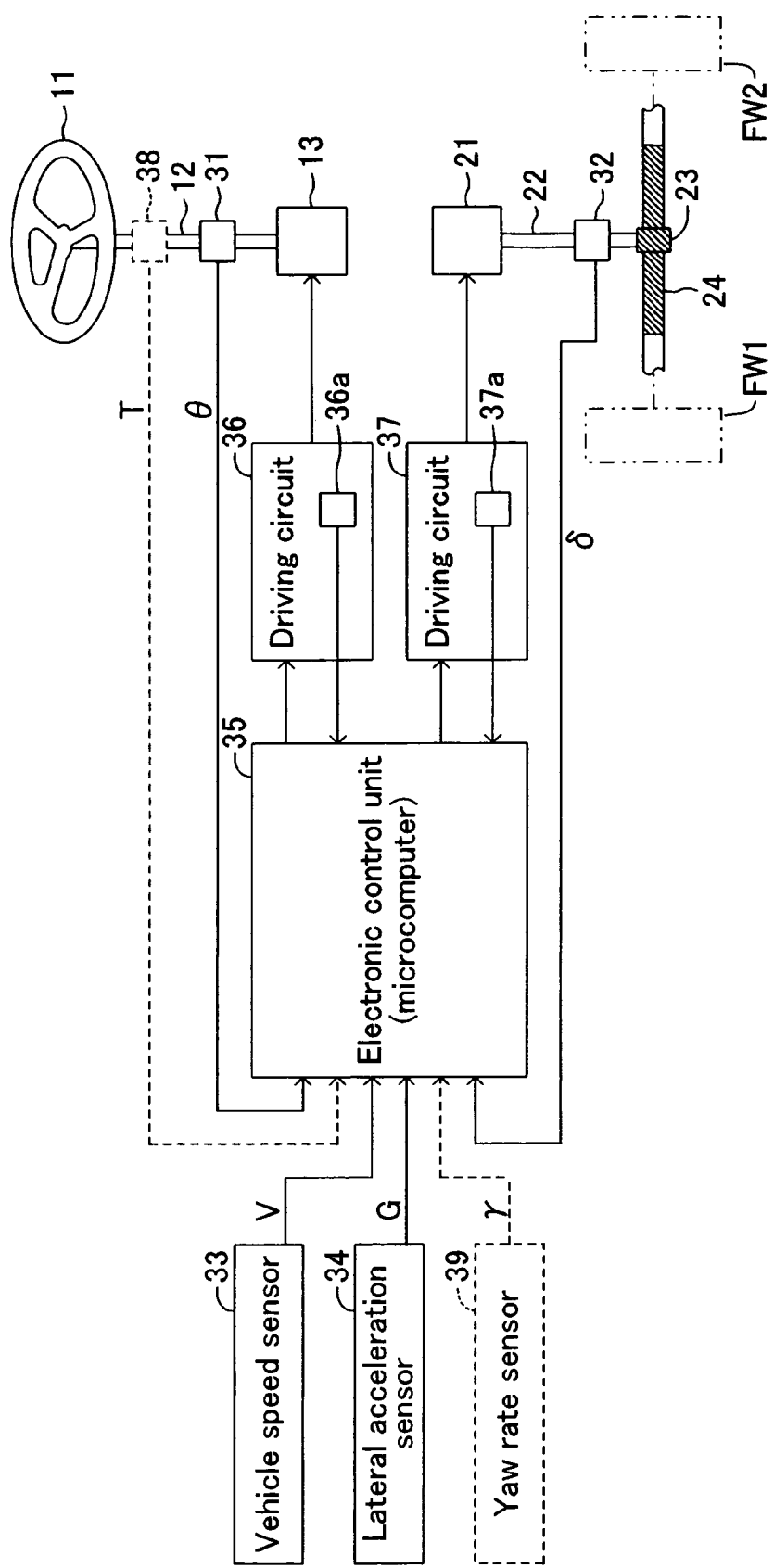
FIG. 1 is a schematic diagram of a vehicle steering apparatus common to first to third embodiments of the present invention.

A vehicle steering apparatus according to a first embodiment of the present invention will be explained hereinafter with reference to the drawings. FIG. 1 is a block diagram schematically showing the vehicle steering apparatus according to the first embodiment.

This steering apparatus is provided with a steering handle 11 as an operating section that is turned by a driver for steering left and right front wheels FW1 and FW2, those of which are steered wheels. The steering handle 11 is fixed to the upper end of a steering input shaft 12. The lower end of the steering input shaft 12 is connected to a reaction force actuator 13 composed of an electric motor and deceleration mechanism. The reaction force actuator 13 exerts reaction force on the turning operation of the steering handle 11 by a driver.

This steering apparatus is further provided with a turning actuator 21 composed of an electric motor and a deceleration mechanism. The turning force by the turning actuator 21 is transmitted to the right and left front wheels FW1 and FW2 via a turning output shaft 22, pinion gear 23 and rack bar 24. According to this configuration, the rotational force from the turning actuator 21 is transmitted to the pinion gear 23 via the turning output shaft 22, whereby the rotation of the pinion gear 23 displaces the rack bar 24 in the axial direction. The displacement of the rack bar 24 in the axial direction allows the right and left front wheels FW1 and FW2 to be turned to the right or to the left.

Subsequently explained is an electronic controller for controlling the rotations of the reaction force actuator 13 and the turning actuator 21. The electronic controller has a steering angle sensor 31, turning angle sensor 32, vehicle speed sensor 33, and lateral acceleration sensor 34.

The steering angle sensor 31 is attached to the steering input shaft 12. It detects the rotation angle of the steering handle 11 from the neutral position and outputs the detected angle as a steering angle θ. The turning angle sensor 32 is attached to the turning output shaft 22. It detects the rotation angle of the turning output shaft 22 from the neutral position and outputs the detected angle as an actual turning angle δ (corresponding to the turning angles of the right and left front wheels FW2 and FW2). It should be noted that the steering angle θ and the actual turning angle δ represent such that, with their neutral positions defined as "0", the rotation angle in the leftward direction is represented by a positive value and the rotation angle in the rightward direction is represented by a negative value. The vehicle speed sensor 33 detects a vehicle speed V and outputs the detected speed. The lateral acceleration sensor 34 detects the actual lateral acceleration G of the vehicle and outputs the resultant. The actual lateral acceleration G is also represented such that the acceleration in the leftward direction is represented by a positive value and the acceleration in the rightward direction is represented by a negative value.

These sensors 31 to 34 are connected to an electronic control unit 35. The electronic control unit 35 has a microcomputer, composed of CPU, ROM, RAM or the like, as a main component. The electronic control unit 35 controls respectively the operations of the reaction force actuator 13 and the turning actuator 21 by the execution of a program. Driving circuits 36 and 37 for driving the reaction force actuator 13 and the turning actuator 21 are connected to the output side of the electronic control unit 35. Disposed in the driving circuits 36 and 37 are current detectors 36a and 37a for detecting driving current flowing through the electric motors in the reaction force actuator 13 and the turning actuator 21. The driving current detected by the current detectors 36a and 37a is fed back to the electronic control unit 35 for controlling the drive of both electric motors.

Figure 2:
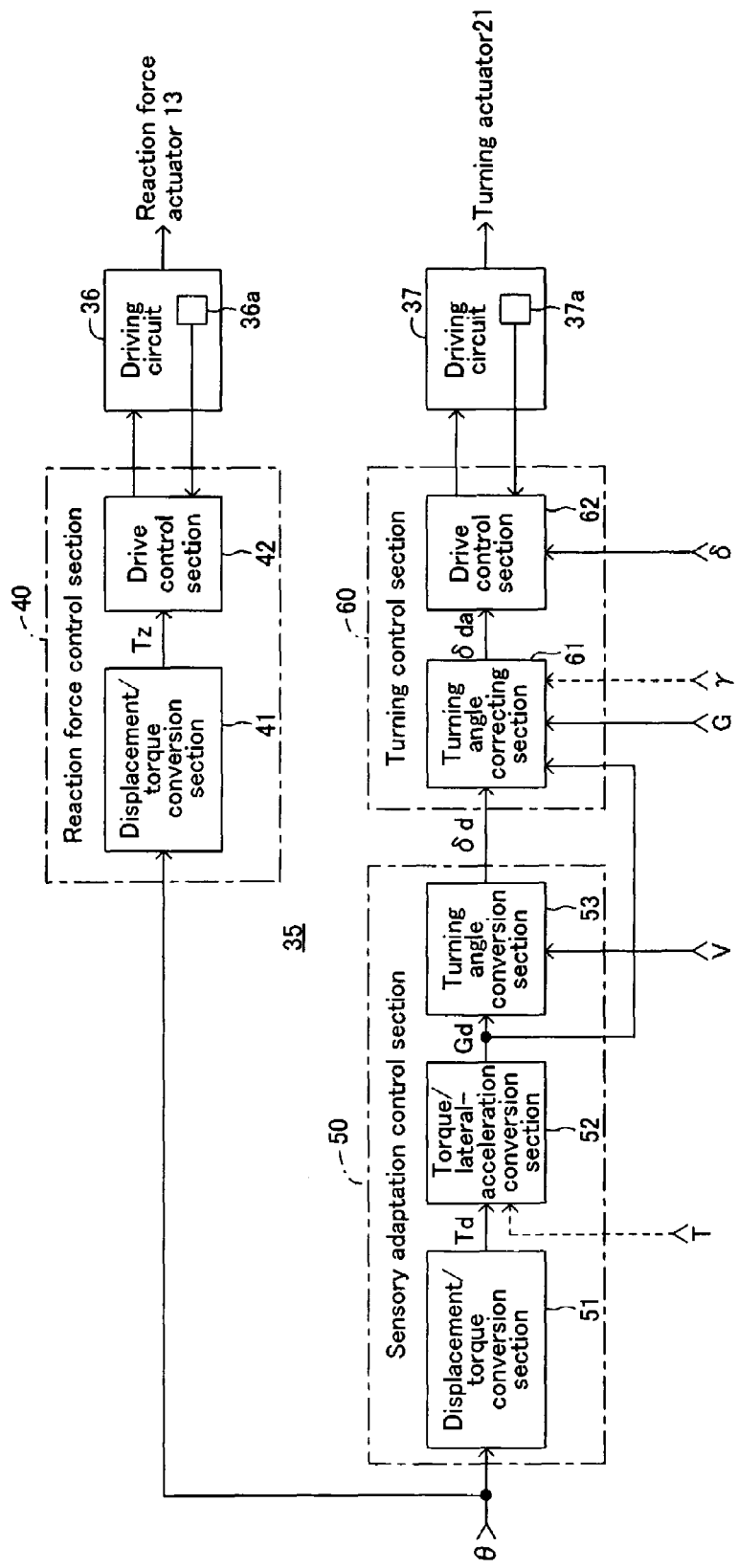
FIG. 2 is a functional block diagram functionally showing a computer program processing executed by an electronic control unit of FIG. 1 according to the first embodiment.

Subsequently, the operation of the first embodiment having the above-mentioned configuration will be explained with reference to a functional block diagram shown in FIG. 2 showing a function realized by a computer program process in the electronic control unit 35. The electronic control unit 35 comprises a reaction force control section 40 for controlling the exertion of reaction force to the steering handle 11, a sensory adaptation control section 50 for determining a target turning angle δd of the right and left front wheels FW1 and FW2 corresponding to the sensation of a driver based upon the turning operation of the steering handle 11 and a turning control section 60 for controlling to turn the right and left front wheels FW1 and FW2 based upon the target turning angle δd.

When the driver turns the steering handle 11, the steering angle sensor 31 detects the steering angle θ that is a rotation angle of the steering handle 11. The detected steering angle θ is outputted to the reaction force control section 40 and the sensory adaptation control section 50 respectively. In the reaction force control section 40, a displacement/torque conversion section 41 calculates reaction force torque $T_Z$, that is the exponential function of the steering angle θ, by using the following equation 1.

$$T_Z = T_O \cdot \exp(K1 \cdot \theta) \qquad \text{(Eq. 1)}$$

Figure 3:
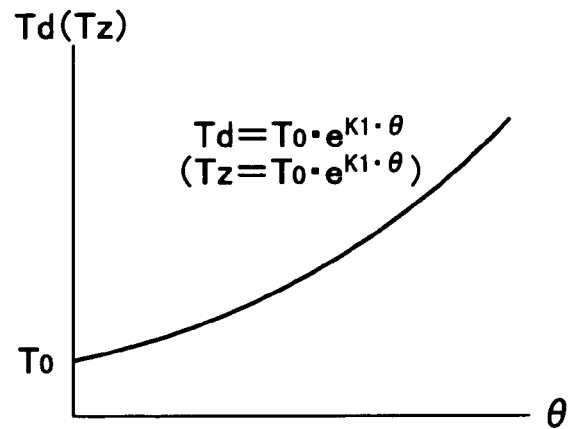
FIG. 3 is a graph showing a relationship between a steering angle and a steering torque.

In this equation, To and K1 are constants, and they will be explained in more detail in the later-described explanation about the sensory adaptation control section 50. The steering angle θ in the equation 1 represents an absolute value of the detected steering angle θ. Therefore, if the detected steering angle θ is positive, the constant To is made negative, while if the detected steering angle θ is negative, the constant To is made positive having the absolute value same as the negative constant To. The reaction force torque $T_Z$ may be calculated by using a conversion table having a characteristic shown in FIG. 3 and having stored therein the reaction force torque $T_Z$ with respect to the steering angle θ, instead of the calculation of the equation 1.

The calculated reaction force torque $T_Z$ is supplied to a drive control section 42. The drive control section 42 inputs driving current flowing through the electric motor in the reaction force actuator 13 from the driving circuit 36 and feedback-controls the driving circuit 36 such that the driving current corresponding to the reaction force torque $T_Z$ flows through the electric motor. The drive control of the electric motor in the reaction force actuator 13 causes the electric motor to exert the reaction force torque $T_Z$ on the steering handle 11 via the steering input shaft 12. Accordingly, the driver turns the steering handle 11, feeling the reaction force torque $T_Z$ that is changed in a manner of exponential function to the steering angle θ, i.e., adding steering torque, that is equal to the reaction force torque $T_Z$, to the steering handle 11. The relationship between the steering angle θ and the reaction force torque $T_Z$ is also in accordance with the Weber-Fechner's law, wherein the driver can turn the steering handle 11, receiving from the steering handle 11 a sensation adapted to a man's perception characteristic.

On the other hand, the steering torque Td is calculated at the displacement/torque conversion section 51 according to the following equation 2, that is similar to the equation 1, from the steering angle θ inputted at the sensory adaptation control section 50.

$$Td = T_O \cdot \exp(K1 \cdot \theta) \qquad \text{(Eq. 2)}$$

In this case, To and K1 in the equation 2 are constants similar to those in the equation 1. The steering angle θ in the equation 2 represents an absolute value of the detected steering angle θ. Therefore, if the detected steering angle θ is positive, the constant To is made positive, while if the detected steering angle θ is negative, the constant To is made negative having the absolute value same as the positive constant To. The steering torque Td may also be calculated by using the conversion table having the characteristic shown in FIG. 3 and having stored therein the steering torque Td with respect to the steering angle θ, instead of the calculation of the equation 2.

The calculated steering torque Td is supplied to the torque/lateral-acceleration conversion section 52. The torque/lateral-acceleration conversion section 52 sets an anticipated lateral acceleration Gd, that is anticipated by the driver from the turning operation of the steering handle 11, to "0" as disclosed in the following equation 3, when the absolute value of the steering torque Td is less than a positive small predetermined value To, while it calculates the anticipated lateral acceleration Gd according to the following equation 4, when the absolute value of the steering torque Td is not less than the positive small predetermined value To.

$$Gd=0(|Td|<T0) \quad \text{(Eq. 3)}$$

$$Gd=C \cdot Td^{K2}(T0 \leq |Td|) \quad \text{(Eq. 4)}$$

Figure 4:
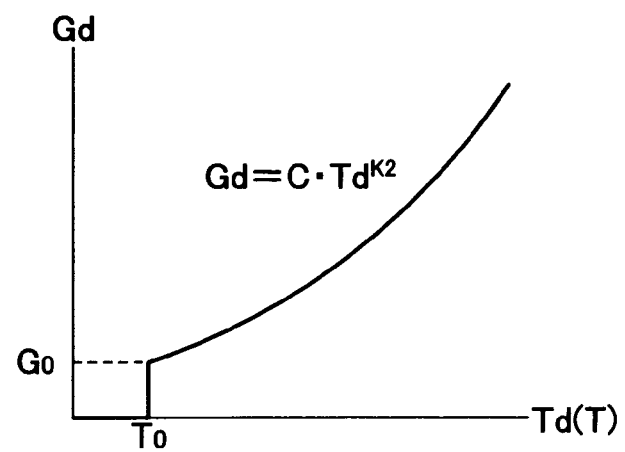
FIG. 4 is a graph showing a relationship between a steering torque and an anticipated lateral acceleration.

C and K2 in the equation 4 are constants. The steering torque Td in the equation 4 represents an absolute value of the steering torque Td calculated by using the equation 2. Therefore, if the calculated steering torque Td is positive, the constant C is made positive, while if the calculated steering torque Td is negative, the constant C is made negative having the absolute value same as the positive constant C. The anticipated lateral acceleration Gd may also be calculated by using a conversion table having a characteristic shown in FIG. 4 and having stored therein the anticipated lateral acceleration Gd with respect to the steering torque Td, instead of the calculations of the equations 3 and 4.

The equation 4 will be explained here. When the steering torque Td is eliminated by using the equation 2, the following equation 5 is obtained.

$$\begin{aligned} Gd &= C \cdot (To \cdot \exp(K1 \cdot \theta))^{K2} \\ &= C \cdot To^{K2} \cdot \exp(K1 \cdot K2 \cdot \theta) \\ &= Go \cdot \exp(K1 \cdot K2 \cdot \theta) \end{aligned} \quad \text{(Eq. 5)}$$

In the equation 5, Go is the constant $C \cdot To^{K2}$, and the equation 5 shows that the anticipated lateral acceleration Gd is changed in a manner of exponential function with respect to the steering angle θ of the steering handle 11 by the driver. The anticipated lateral acceleration Gd is a physical quantity that the driver can perceive by the contact of a part of the driver's body to a predetermined section in the vehicle, and is in accordance with the Weber-Fechner's law. Accordingly, if the driver can turn the steering handle 11 as perceiving the lateral acceleration equal to the anticipated lateral acceleration Gd, the relationship between the turning operation of the steering handle 11 and the vehicle steering can be associated with the human's perception characteristic.

Since the anticipated lateral acceleration Gd represented by the equation 4 (i.e., equation 5) is changed in the manner of exponential function with respect to the steering angle θ that is the turning amount of the steering handle 11 as described above, the anticipated lateral acceleration Gd is adapted to the human's perception characteristic. Further, the easiest process in the turning operation of the steering handle 11 by the driver is to turn the steering handle 11 at a constant speed ω (θ=ω·t). According to this turning operation, the anticipated lateral acceleration Gd changes in the manner of exponential function with respect to a time t as represented by the following equation 6. Accordingly, it is understood that the turning operation of the steering handle 11 by the driver is facilitated if the driver can turn the steering handle 11 as perceiving the lateral acceleration equal to the anticipated lateral acceleration Gd.

$$Gd=Go \cdot \exp(K0 \cdot \omega \cdot t) \quad \text{(Eq. 6)}$$

It should be noted that K0 is a constant having a relationship of $K0=K1 \cdot K2$.

Further, as represented by the equation 3, the anticipated lateral acceleration Gd is kept to be "0" in case where the steering torque Td is less than the predetermined value To. The reason of this is as follows. The steering torque Td takes the positive predetermined value To by the calculation of the equation 2, even if the steering angle θ is "0", i.e., even if the steering handle 11 is held in the neutral position. If this steering torque Td (=To) is applied to the calculation of the equation 4, the anticipated lateral acceleration Gd becomes a positive value $C \cdot To^{K2}$, but this is not realistic. However, if the steering torque Td is less than the predetermined value To as described above, the anticipated lateral acceleration Gd is "0", whereby this problem can be solved.

Supposing that the minimum steering torque that the driver can perceive is defined as the predetermined value To, the minimum sensible lateral acceleration that the driver can perceive is defined as Go and the predetermined value To has the relationship of $Go=C \cdot To^{K2}$, the anticipated lateral acceleration Gd of a vehicle can be kept to be "0" until the steering torque Td takes the predetermined value To, i.e., until the driver senses the lateral acceleration generated on the vehicle by the turn of the vehicle due to the turning operation of the steering handle 11. According to this, right and left front wheels FW1 and FW2 are controlled to be turned by the turning angle necessary for generating the anticipated lateral acceleration Gd only when the steering handle 11 is steered with not less than the minimum steering torque To. This turning control accurately corresponds to the vehicle steering.

Subsequently explained is how to determine the parameters K1, K2 and C (predetermined values K1, K2 and C) used in the equations 1 to 6. In the explanation of how to determine the parameters K1, K2 and C, the steering torque Td and the anticipated lateral acceleration Gd in the equations 2 to 6 are handled as the steering torque T and the lateral acceleration G. According to the Weber-Fechner's law described above, "the ratio of ΔS/S of the minimum change ΔS in the physical quantity that the human can perceive and the physical quantity S at this point is constant regardless of the value of the physical quantity S, and this ratio ΔS/S is called the Weber ratio". The present inventors have confirmed that the Weber-Fechner's law is established in the steering torque and the lateral acceleration, and has carried out the following test to various types of people whose sex, age, driving experience, etc. are varied, in order to decide the Weber ratio.

As for the steering torque, a torque sensor is attached to the steering handle of a vehicle. Test torque was externally applied to the steering handle and this test torque was varied in various manners, thereby measuring a man's steering torque adjusting ability that he/she gives operation force to the steering handle against this test torque for making an adjustment so as not to rotate the steering handle. Specifically, under the aforesaid condition, the ratio ΔT/T, supposing that the detected steering torque at a certain point is defined as T and the minimum steering torque changing amount that he/she can sense the change from the detected steering torque T is defined as ΔT, i.e., the Weber ratio was measured for various types of people. As a result of this test, the Weber ratio ΔT/T became generally a constant value of about 0.03 for various types of people, regardless of the operating direction of the steering handle, the form of hands gripping the steering handle, magnitude or direction of the test torque or the like.

A test for the lateral acceleration is as follows. A wall member was provided at the side of the driver's seat, and a force sensor for detecting pressing force of a man's shoulder to the wall member was attached. The steering handle was gripped by a man and a man's shoulder was brought into contact with the force sensor on the wall member. Test force was externally applied to the wall member in the widthwise direction with respect to the man and the test force was varied in various manners, thereby measuring a man's lateral force adjusting ability that the man pushed the wall member against this test force so as not to move the wall member, i.e., that the man held his/her posture. Specifically, under this condition, the ratio ΔF/F, supposing that the detected force at a certain point that the man keeps his/her posture as standing the external lateral force is defined as F and the minimum force changing amount that he/she can sense the change from the detected force F is defined as ΔF, i.e., the Weber ratio was measured for various types of people. As a result of this test, the Weber ratio ΔF/F became generally a constant value of about 0.09 for various types of people, regardless of the magnitude or direction of the reference force applied to the wall member.

On the other hand, when the equation 2 is differentiated and the equation 2 is considered in the differentiated equation, the following equation 7 is established.

$$\Delta T = To \cdot \exp(K1 \cdot \theta) \cdot K1 \cdot \Delta\theta = T \cdot K1 \cdot \Delta\theta \quad \text{(Eq. 7)}$$

When this equation 7 is changed and the Weber ratio ΔT/T relating to the steering torque obtained by the above-mentioned test is defined as Kt, the following equation 8 is established.

$$K1 = \Delta T/(T \cdot \Delta\theta) = Kt/\Delta\theta \quad \text{(Eq. 8)}$$

Further, supposing that the maximum steering torque is Tmax, the following equation 9 is established from the equation 2.

$$Tmax = To \cdot \exp(K1 \cdot \theta max) \quad \text{(Eq. 9)}$$

Changing this equation 9 establishes the following equation 10.

$$K1 = \log(Tmax/To)/\theta max \quad \text{(Eq. 10)}$$

Then, the following equation 11 is derived from the equations 8 and 10.

$$\Delta\theta = Kt/K1 = Kt \cdot \theta max/\log(Tmax/To) \quad \text{(Eq. 11)}$$

In this equation 11, Kt is the Weber ratio of the steering torque T, θmax is the maximum value of the steering angle, Tmax is the maximum value of the steering torque, and To corresponds to the minimum steering torque that a man can perceive. These values Kt, θmax, Tmax and To are constants determined by the test and system, so that the differential value Δθ can be calculated by using the equation 11. The predetermined value (coefficient) K1 can also be calculated by using this differential value Δθ and the Weber ratio Kt based upon the equation 8.

When the equation 4 is differentiated and the equation 4 is considered in the differentiated equation, the following equation 12 is established.

$$\Delta G = C \cdot K2 \cdot T^{K2-1} \cdot \Delta T = G \cdot K2 \cdot \Delta T/T \quad \text{(Eq. 12)}$$

When this equation 12 is changed, the Weber ratio ΔT/T relating to the steering torque obtained by the above-mentioned test is defined as Kt and the Weber ratio ΔF/F relating to the lateral acceleration is defined as Ka, the following equations 13 and 14 are established.

$$\Delta G/G = K2 \cdot \Delta T/T \quad \text{(Eq. 13)}$$

$$K2 = Ka/Kt \quad \text{(Eq. 14)}$$

In the equation 14, Kt is the Weber ratio relating to the steering torque and Ka is the Weber ratio relating to the lateral acceleration. Both are given as constants, so that the coefficient K2 can also be calculated based upon the equation 14 by using these Weber ratios Kt and Ka.

Supposing that the maximum value of the lateral acceleration is Gmax and the maximum value of the steering torque is Tmax, the following equation 15 is derived from the equation 4.

$$C = Gmax/Tmax^{K2} \quad \text{(Eq. 15)}$$

In this equation 15, Gmax and Tmax are constants determined by the test and system, and K2 is calculated by the equation 14, so that the constant (coefficient) C can also be calculated.

As described above, by determining the maximum value θmax of the steering angle θ, maximum value Tmax of the steering torque T, maximum value Gmax of the lateral acceleration G, minimum steering torque To, minimum sensible lateral acceleration Go, the Weber ratio Kt relating to the steering torque T and the Weber ratio Ka relating to the lateral acceleration by the test and system, the coefficients K1, K2 and C in the equations 1 to 5 can be determined beforehand by calculation. The preferable numerical examples by the experiment will be shown below, in the vehicle having the wheel base L of 2.67 m, θmax=π/2, Tmax=3.5 Nm, Gmax=9.8 m/s/s, To=0.76 Nm, Go=0.1 m/s/s, Kt=0.03, and Ka=0.09. In this case, K1=0.17, K2=3.0, C=0.23. It is to be noted that, in this case, Δθ=0.18. Accordingly, the reaction force torque Tz, steering torque Td, and anticipated lateral acceleration Gd, those of which are adapted to the perception characteristic of a driver, can be calculated by using the equations 1 to 5 at the displacement/torque conversion sections 41, 51, and torque/lateral-acceleration conversion section 52.

Figure 5:
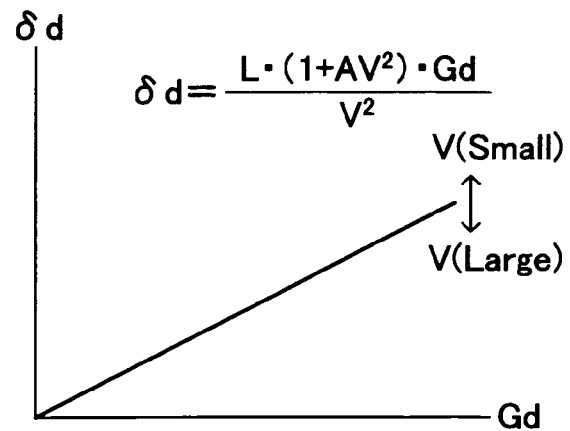
FIG. 5 is a graph showing a relationship between an anticipated lateral acceleration and a target turning angle.

Returning again to the explanation about FIG. 2, the anticipated lateral acceleration Gd calculated at the torque/lateral-acceleration conversion section 52 is supplied to a turning angle conversion section 53. The turning angle conversion section 53 calculates the target turning angle δd of the right and left front wheels FW1 and FW2 necessary for generating the anticipated lateral acceleration Gd. As shown in FIG. 5, the turning angle conversion section 53 has a table representing a changing characteristic of the target turning angle δd, which changes according to the vehicle speed V, with respect to the anticipated lateral acceleration Gd. This table is a set of data collected by running the vehicle as the vehicle speed V is changed and measuring beforehand the turning angle δ of the right and left front wheels FW1 and FW2 and the lateral acceleration G. The turning angle conversion section 53 refers to this table for calculating the target turning angle δd corresponding to the inputted anticipated lateral acceleration Gd and the detected vehicle speed V inputted from the vehicle speed sensor 33. Although the lateral acceleration G (anticipated lateral acceleration Gd) and the target turning angle δd stored in the table are both positive, the outputted target turning angle δd becomes negative if the anticipated lateral acceleration Gd supplied from the torque/lateral-acceleration conversion section 52 is negative.

Since the target turning angle δd is a function of the vehicle speed V and the lateral acceleration G as shown in the following equation 16, the target turning angle δd can also be calculated by the computation of the following equation 16, instead of referring to the table.

$$\delta d = L \cdot (1 + A \cdot V^2) \cdot Gd/V^2 \quad \text{(Eq. 16)}$$

In the equation 16, L is a given value (e.g., 2.67 m) determined beforehand showing a wheel base and A is a given value determined beforehand (e.g., 0.00187).

The calculated target turning angle δd is supplied to a turning angle correcting section 61 of the turning control section 60. The turning angle correcting section 61 inputs the anticipated lateral acceleration Gd from the torque/lateral-acceleration conversion section 52 as well as inputs the actual lateral acceleration G detected by the lateral acceleration sensor 34. It executes the computation of the following equation 17 for calculating the corrected target turning angle δda.

$$\delta da = \delta d + K3 \cdot (Gd - G) \quad \text{(Eq. 17)}$$

The coefficient K3 is a predetermined positive constant. The absolute value of the corrected target turning angle δda is corrected to be increased, in case where the actual lateral acceleration G is less than the anticipated lateral acceleration Gd. Further, the absolute value of the corrected target turning angle δda is corrected to be decreased, in case where the actual lateral acceleration G exceeds the anticipated lateral acceleration Gd. This correction ensures the turning angles of the right and left front wheels FW1 and FW2 necessary for the anticipated lateral acceleration Gd with high precision.

The calculated corrected target turning angle δda is supplied to a drive control section 62. The drive control section 62 inputs the actual turning angle δ detected by the turning angle sensor 32 and feedback-controls the rotation of the electric motor in the turning actuator 21 such that the right and left front wheels FW1 and FW2 are turned into the corrected target turning angle δda. Further, the drive control section 62 also inputs the driving current flowing from the driving circuit 37 to the electric motor and feedback-controls the driving circuit 37 such that the driving current having a magnitude corresponding to the turning torque appropriately flows through the electric motor. By the drive control of the electric motor in the turning actuator 21, the rotation of the electric motor is transmitted to the pinion gear 23 via the turning output shaft 22, thereby displacing the rack bar 24 in the shaft direction by the pinion gear 23. The displacement of the rack bar 24 in the shaft direction turns the right and left front wheels FW1 and FW2 into the corrected target turning angle δda.

As understood from the explanation of the operation, the steering angle θ as the operation input value by the driver to the steering handle 11 is converted into the steering torque Td at the displacement/torque conversion section 51 according to the first embodiment. The converted steering torque Td is converted into the anticipated lateral acceleration Gd at the torque/lateral-acceleration conversion section 52. The right and left front wheels FW1 and FW2 are turned into the corrected target turning angle δda necessary for generating the anticipated lateral acceleration Gd by the turning angle conversion section 53, the turning angle correcting section 61 and drive control section 62. In this case, the steering torque Td is a physical quantity that can be perceived by the driver from the steering handle 11 due to the action of the reaction force actuator 13. The steering torque Td is also changed in the manner of exponential function with respect to the steering angle θ. Therefore, the driver can turn the steering handle 11 according to the man's perception characteristic, while feeling the reaction force according to the Weber-Fechner's law.

Further, the actual lateral acceleration G generated on the vehicle due to the turning of the right and left front wheels FW1 and FW2 is also a physical quantity that can be perceived, and this actual lateral acceleration G is controlled so as to be equal to the anticipated lateral acceleration Gd, and this anticipated lateral acceleration Gd is also changed in the manner of exponentiation function with respect to the steering angle θ. Accordingly, the driver can turn the steering handle 11 according to the man's perception characteristic, while feeling the lateral acceleration in accordance with the Weber-Fechner's law, thereby being capable of turning the vehicle. As a result, the driver can operate the steering handle 11 for adaptation to the man's perception characteristic, thereby being capable of easily driving the vehicle.

Further, the turning angle correcting section 61 corrects the target turning angle δd such that the actual lateral acceleration G actually generated on the vehicle correctly corresponds to the steering angle θ of the steering handle 11, whereby the actual lateral acceleration G correctly corresponding to the steering angle θ of the steering handle 11 is generated on the vehicle. As a result, the driver can turn the steering handle 11, while sensing the lateral acceleration correctly adapting to the man's perception characteristic. Therefore, driving the vehicle is more facilitated.

Explaining more specifically the effect of the operation of the above-mentioned embodiment, the vehicle steering apparatus according to the aforesaid embodiment can provide steering characteristic that does not depend upon the vehicle characteristic and that is in accordance with the sense of a driver. Therefore, the driver has no feeling of a so-called over-steer and under-steer, so that the driver can freely steer the vehicle with a neutral steer up to the limit turning performance of the vehicle.

Further, the lateral acceleration that is to be generated with respect to the steering amount of the steering handle 11 can correctly be predicted when the vehicle makes a turn or turns the corner, whereby the driver can correctly steer the vehicle in accordance with the running environment. Moreover, when the vehicle finishes the turn and returns to a straight road, the lateral acceleration can gently be reduced, so that the vehicle can smoothly return to the state of going straight. Accordingly, the driver can simply steer the vehicle and can steer the vehicle as per driver's intention, with the result that the driver and the other occupants do not have an uncomfortable feeling caused by a jolt of their bodies from the start of the vehicle turn to the end of the vehicle turn.

Further, the vehicle steering characteristic is set by a function in accordance with a man's sense. So long as the function that determines the steering characteristic is not changed, a small change in the parameter of the mechanism given to the vehicle steering does not affect the driving operation. Therefore, robust performance is highly maintained for the change in the vehicle characteristic such as an exchange of tire, abrasion of tire, loading condition, or the like. Further, even if the steering force necessary for turning the steering handle 11 is varied, or even if the turning response of the steering handle 11 to the turning operation is varied, the vehicle is steered in accordance with a man's sense. Accordingly, even if a driver switches to a vehicle provided with a steering handle 11 having different characteristic, the driver can drive the vehicle without having a sense of incongruity, and further, the driver can promptly apply to the driving of the vehicle.

In the above-mentioned embodiment, the steering torque Td is considered. However, if the driver turns the steering handle 11 at the steering angle θ, the target turning angle δd is determined by using the steering angle θ, and the left and right front wheels FW1 and FW2 are turned into the target turning angle δd. Accordingly, even if the reaction force torque Tz given to the steering handle 11 is not correctly controlled, the effect of the reaction force torque not correctly controlled upon the vehicle steering characteristic is small. Therefore, a mechanism for exerting reaction force on the steering handle 11 can simply be composed.

Subsequently explained is a modified example of the above-mentioned first embodiment in which the steering torque T is utilized as the operation input value of the steering handle 11. As shown by a broken line in FIG. 1, this modified example is provided with a steering torque sensor 38 that is attached to the steering input shaft 12 for detecting the steering torque T exerted on the steering handle 11. The other configurations are the same as those of the first embodiment, but the computer program executed by the electronic control unit 35 is slightly different from the first embodiment.

In this modified example, the displacement/torque conversion section 51 is not provided, and the torque/lateral-acceleration conversion section 52 calculates the anticipated lateral acceleration Gd by the execution of the computation of the equations 3 and 4 using the steering torque T detected by the steering torque sensor 38 instead of the steering torque Td calculated by the displacement/torque conversion section 51, in the functional block diagram of FIG. 2 representing the computer program. In this case too, the anticipated lateral acceleration Gd may be calculated by using the table representing the characteristic shown in FIG. 4 instead of the execution of the computation of the equations 3 and 4. The other program processings executed by the electronic control unit 35 are the same as those in the first embodiment.

According to this modified example, the steering torque T serving as the operation input value of the driver to the steering handle 11 is converted into the anticipated lateral acceleration Gd by the torque/lateral-acceleration conversion section 52, whereby the right and left front wheels FW1 and FW2 are turned into the corrected target turning angle δda necessary for the generation of the anticipated lateral acceleration Gd by the turning angle conversion section 53, turning angle correcting section 61 and the drive control section 62. In this case too, the steering torque T is a physical quantity that the driver can perceive from the steering handle 11 and the anticipated lateral acceleration Gd is also changed in the manner of exponentiation function with respect to the steering torque T. Accordingly, the driver can turn the steering handle 11 according to the man's perception characteristic, while feeling the reaction force in accordance with the Weber-Fechner's law. Accordingly, in this modification example too, the driver can turn the steering handle 11 according to the man's perception characteristic, while feeling the lateral acceleration in accordance with the Weber-Fechner's law, thereby being capable of turning the vehicle, like the first embodiment. Therefore, the same effect as the first embodiment is expected.

Further, the vehicle steering control by the first embodiment and the vehicle steering control by the modified example may be changed over. Specifically, the steering angle sensor 31 and the steering torque sensor 38 are both provided, wherein the change-over can be carried out between the case where the anticipated lateral acceleration Gd is calculated by using the target steering torque Td calculated at the displacement/torque conversion section 51 like the first embodiment and the case where the anticipated lateral acceleration Gd is calculated by using the steering torque T detected by the steering torque sensor 38. In this case, the change-over may be changed according to the intention of the driver or may automatically be changed according to the vehicle motion state.

In the aforesaid first embodiment, the turning angle correcting section 61 corrects the target turning angle δd in accordance with the difference Gd−G between the anticipated lateral acceleration Gd and the actual lateral acceleration G. However, instead of this or in addition to this, the turning angle correcting section 61 may correct the target turning angle δd in accordance with the difference γd−γ between the anticipated yaw rate δd and the actual yaw rate γ. In this case, the anticipated yaw rate γd is calculated by the computation of the following equation 18 by using the anticipated lateral acceleration Gd and the vehicle speed V.

$$\gamma d = Gd/V \tag{Eq. 18}$$

The corrected target turning angle δda may be calculated based upon the following equation 19 using this calculated anticipated yaw rate γd and the actual yaw rate γ detected by the yaw rate sensor 39 shown by a broken line in FIG. 1.

$$\delta da = \delta d + K4 \cdot (\gamma d - \gamma) \tag{Eq. 19}$$

The coefficient K4 is a predetermined positive constant. The absolute value of the corrected target turning angle δda is corrected to be increased, in case where the actual yaw rate γ is less than the anticipated yaw rate γd. Further, the absolute value of the corrected target turning angle δda is corrected to be decreased, in case where the actual yaw rate γ exceeds the anticipated yaw rate γd. This correction ensures the turning angles of the right and left front wheels FW1 and FW2 necessary for the anticipated yaw rate γd with high precision.

Second Embodiment

Subsequently explained is a second embodiment of the present invention using a yaw rate instead of the lateral acceleration as the motion state quantity in the first embodiment. In the second embodiment, as shown by a broken line in FIG. 1, a yaw rate sensor 39 is provided for detecting the actual yaw rate γ that is the motion state quantity the driver can perceive, instead of the lateral acceleration sensor 34 in the first embodiment. The other configurations are the same as those in the first embodiment, but the computer program executed by the electronic control unit 35 is slightly different from the first embodiment.

Figure 6:
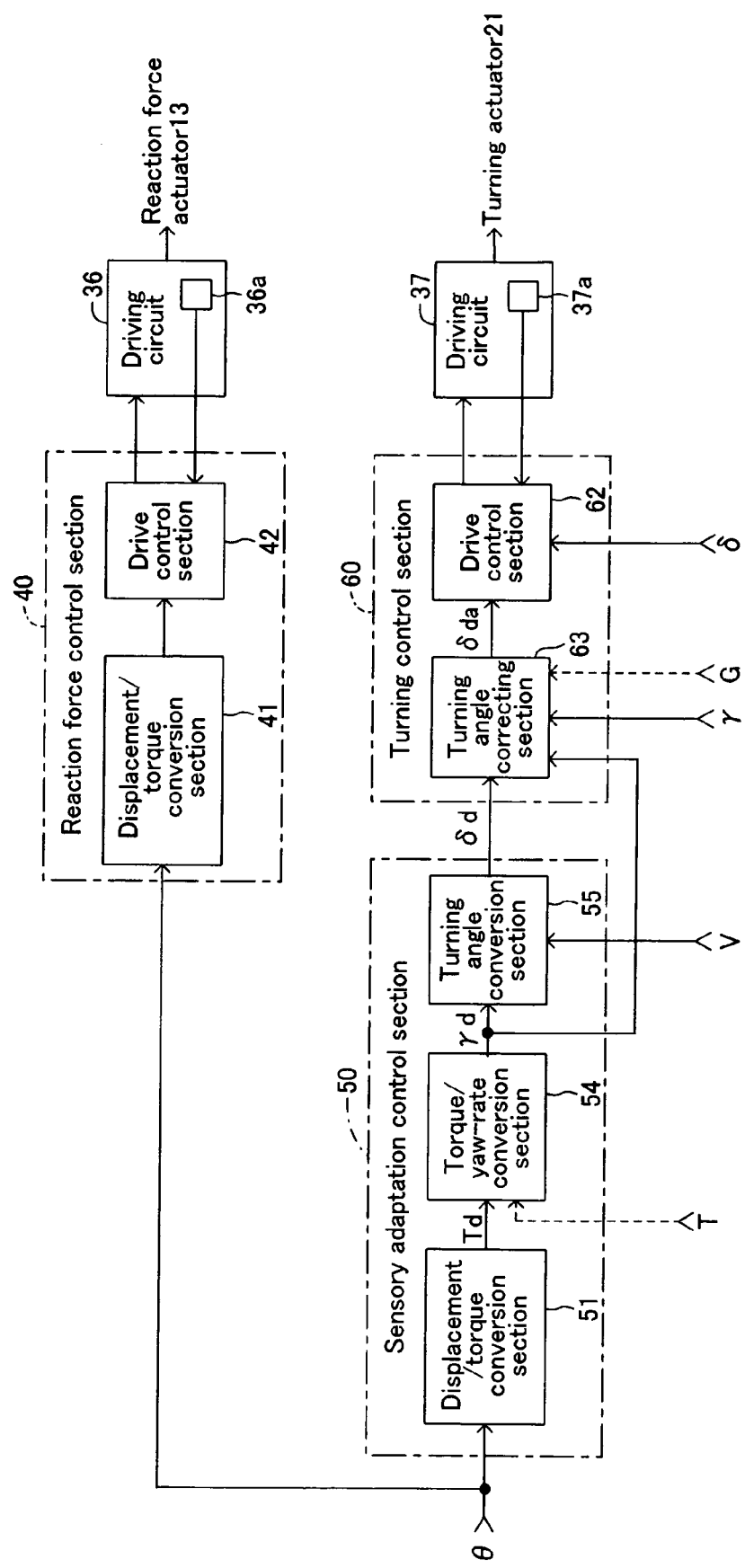
FIG. 6 is a functional block diagram functionally showing a computer program processing executed by an electronic control unit of FIG. 1 according to the second embodiment.

In the second embodiment, the computer program executed by the electronic control unit 35 is shown by a functional block diagram of FIG. 6. In this case, at the sensory adaptation control section 50, the displacement/torque conversion section 51 functions in the same manner as in the first embodiment, and a torque/yaw-rate conversion section 54 is provided instead of the torque/lateral-acceleration conversion section 52 in the first embodiment.

By using the steering torque Td calculated at the displacement/torque conversion section 51, the torque/yaw-rate conversion section 54 sets an anticipated yaw rate γd anticipated by the driver from the turning operation of the steering handle 11 to "0" as disclosed in the following equation 20, if the absolute value of the steering torque Td is less than the positive small predetermined value To, while it calculates the anticipated yaw rate γd in accordance with the following equation 21, if the absolute value of the steering torque Td is not less than the positive small predetermined value To.

$$\gamma d = 0 \quad (|Td| < To) \tag{Eq. 20}$$

$$\gamma d = C \cdot Td^{K2} \quad (To < |Td|) \tag{Eq. 21}$$

Figure 7:
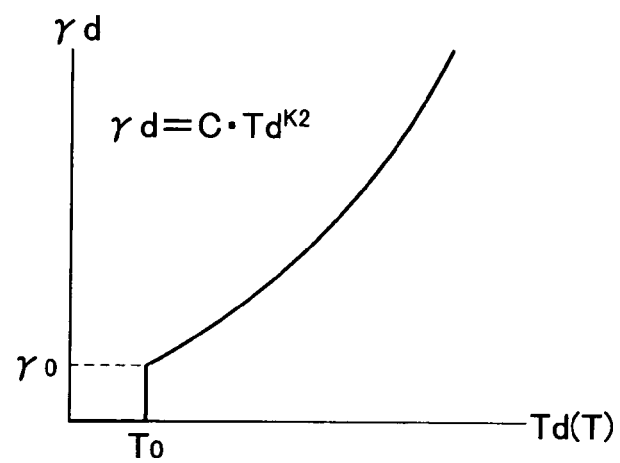
FIG. 7 is a graph showing a relationship between a steering torque and an anticipated yaw rate.

C and K2 in the equation 21 are constants like the first embodiment. The steering torque Td in the equation 21 also represents an absolute value of the steering torque Td calculated by using the equation 2. Therefore, if the calculated steering torque Td is positive, the constant C is made positive, while if the calculated steering torque Td is negative, the constant C is made negative having the absolute value same as the positive constant C. The anticipated yaw rate γd may also be calculated by using a conversion table having a characteristic shown in FIG. 7 and having stored therein the anticipated yaw rate γd with respect to the steering torque Td, instead of the calculations of the equations 20 and 21

Figure 8:
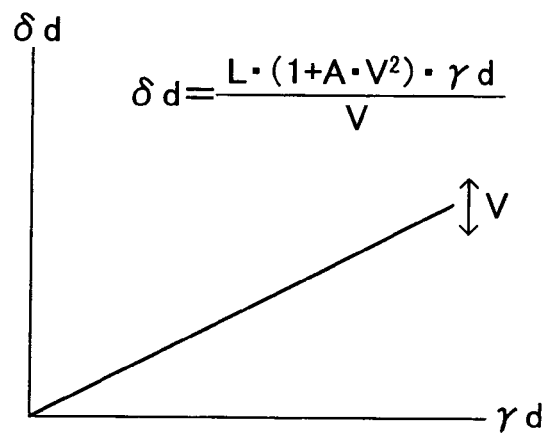
FIG. 8 is a graph showing a relationship between an anticipated yaw rate and a target turning angle.

A turning angle conversion section 55 calculates the target turning angle δd of the right and left front wheels FW1 and FW2 necessary for generating the calculated anticipated yaw rate γd. As shown in FIG. 8, the turning angle conversion section 55 has a table representing a changing characteristic of the target turning angle δd, which changes according to the vehicle speed V, with respect to the anticipated yaw rate γd. This table is a set of data collected by running the vehicle as the vehicle speed V is changed and measuring beforehand the turning angle δ of the right and left front wheels FW1 and FW2 and the yaw rate γ. The turning angle conversion section 55 refers to this table for calculating the target turning angle δd corresponding to the inputted anticipated yaw rate γd and the detected vehicle speed V inputted from the vehicle speed sensor 33. Although the yaw rate γ (anticipated yaw rate γd) and the target turning angle δd stored in the table are both positive, the outputted target turning angle δd becomes negative if the anticipated yaw rate γd supplied from the torque/yaw-rate conversion section 54 is negative.

Since the target turning angle δd is a function of the vehicle speed V and the yaw rate γ as shown in the following equation 22, the target turning angle δd can also be calculated by the computation of the following equation 22, instead of referring to the table.

$$\delta d = L \cdot (1 + A \cdot V^2) \cdot \gamma d / V \quad \text{(Eq. 22)}$$

In the equation 22, L is a given value (e.g., 2.67 m) determined beforehand showing a wheel base and A is a given value (e.g., 0.00187) determined beforehand.

The calculated target turning angle δd is supplied to a turning angle correcting section 63 of the turning control section 60. The turning angle correcting section 63 inputs the anticipated yaw rate γd from the torque/yaw-rate conversion section 54 as well as inputs the actual yaw rate γ detected by the yaw rate sensor 34. It executes the computation of the following equation 23 for correcting the inputted target turning angle δd and calculating the corrected target turning angle δda.

$$\delta da = \delta d + K4 \cdot (\gamma d - \gamma) \quad \text{(Eq. 23)}$$

The coefficient K4 is a predetermined positive constant. The absolute value of the corrected target turning angle δda is corrected to be increased, in case where the actual yaw rate γ is less than the anticipated yaw rate γd. Further, the absolute value of the corrected target turning angle δda is corrected to be decreased, in case where the actual yaw rate γ exceeds the anticipated yaw rate γd. This correction ensures the turning angles of the right and left front wheels FW1 and FW2 necessary for the anticipated yaw rate γd with high precision.

The other program processings executed by the electronic control unit 35 are the same as those in the above-mentioned first embodiment. Therefore, same numerals are given to the components in the functional block diagram of FIG. 6 as those in FIG. 2 in the first embodiment for omitting the detailed explanation thereof.

In this second embodiment too, the steering angle θ as the operation input value by the driver to the steering handle 11 is converted into the steering torque Td at the displacement/torque conversion section 51. The converted steering torque Td is converted into the anticipated yaw rate γd at the torque/yaw-rate conversion section 54. The right and left front wheels FW1 and FW2 are turned into the corrected target turning angle δda necessary for generating the anticipated yaw rate γd by the turning angle conversion section 55, the turning angle correcting section 63 and drive control section 62. In this case, the steering torque Td is a physical quantity that can be perceived by the driver from the steering handle 11 due to the action of the reaction force actuator 13. The steering torque Td is also changed in the manner of exponential function with respect to the steering angle θ. Therefore, the driver can turn the steering handle 11 according to the man's perception characteristic, while feeling the reaction force according to the Weber-Fechner's law. Further, the actual yaw rate γ generated on the vehicle due to the turning of the right and left front wheels FW1 and FW2 is also a physical quantity that can be perceived, and this actual yaw rate γ is controlled so as to be equal to the anticipated yaw rate γd, and this anticipated yaw rate γd is also changed in the manner of exponentiation function with respect to the steering angle θ. Accordingly, the driver can turn the steering handle 11 according to the man's perception characteristic, while feeling the yaw rate in accordance with the Weber-Fechner's law, thereby being capable of turning the vehicle. As a result, the driver can operate the steering handle 11 for adaptation to the man's perception characteristic, like the first embodiment, thereby being capable of easily driving the vehicle.

Further, the turning angle correcting section 63 corrects the target turning angle δd such that the actual yaw rate γ actually generated on the vehicle correctly corresponds to the steering angle θ of the steering handle 11, whereby the actual yaw rate γ correctly corresponding to the steering angle θ of the steering handle 11 is generated on the vehicle. As a result, the driver can turn the steering handle 11, while sensing the yaw rate correctly adapting to the man's perception characteristic. Therefore, driving the vehicle is more facilitated. Further, the specific effect of the operation is the same as that of the first embodiment except for replacing the lateral acceleration in the first embodiment with the yaw rate.

This second embodiment can be modified to utilize the steering torque T as the operation input value of the steering handle 11, like the aforesaid first embodiment. As shown by a broken line in FIG. 1, this modified example is provided with a steering torque sensor 38 that is attached to the steering input shaft 12 for detecting the steering torque T exerted on the steering handle 11. The displacement/torque conversion section 51 is not provided, and the torque/yaw-rate conversion section 54 calculates the anticipated yaw rate γd by the execution of the computation of the equations 20 and 21 using the steering torque T detected by the steering torque sensor 38 instead of the steering torque Td calculated by the displacement/torque conversion section 51. In this case too, the anticipated yaw rate γd may be calculated by using the table representing the characteristic shown in FIG. 7 instead of the execution of the computation of the equations 20 and 21. The other program processings executed by the electronic control unit 35 are the same as those in the second embodiment.

According to this modified example, the steering torque T serving as the operation input value of the driver to the steering handle 11 is converted into the anticipated yaw rate γd by the torque/yaw-rate conversion section 54, whereby the right and left front wheels FW1 and FW2 are turned into the corrected target turning angle δda necessary for the generation of the anticipated yaw rate γd by the turning angle conversion section 55, turning angle correcting section 63 and the drive control section 62. In this case too, the steering torque T is a physical quantity that the driver can perceive from the steering handle 11 and the anticipated yaw rate γd is also changed in the manner of exponentiation function with respect to the steering torque T. Accordingly, the driver can turn the steering handle 11 according to the man's perception characteristic, while feeling the reaction force in accordance with the Weber-Fechner's law. Accordingly, in this modification example too, the driver can turn the steering handle 11 according to the man's perception characteristic, while feeling the yaw rate in accordance with the Weber-Fechner's law, thereby being capable of turning the vehicle, like the second embodiment. Therefore, the same effect as the second embodiment is expected.

Further, the vehicle steering control by the second embodiment and the vehicle steering control by the modified example may be changed over. Specifically, the steering angle sensor 31 and the steering torque sensor 38 are both provided, wherein the change-over can be carried out between the case where the anticipated yaw rate γd is calculated by using the target steering torque Td calculated at the displacement/torque conversion section 51 like the second embodiment and the case where the anticipated yaw rate yd is calculated by using the steering torque T detected by the steering torque sensor 38. In this case, the change-over may be changed according to the intention of the driver or may automatically be changed according to the vehicle motion state.

In the aforesaid second embodiment, the turning angle correcting section 63 corrects the target turning angle δd in accordance with the difference γd−γ between the anticipated yaw rate γd and the actual yaw rate γ. However, instead of this or in addition to this, the turning angle correcting section 61 may correct the target turning angle δd in accordance with the difference Gd−G between the anticipated lateral acceleration Gd and the actual lateral acceleration G. In this case, the anticipated lateral acceleration Gd is calculated by the computation of the following equation 24 by using the anticipated yaw rate γd and the vehicle speed V.

$$Gd = \gamma d \cdot V \qquad \text{Equation 24}$$

The corrected target turning angle δd may be calculated based upon the following equation 25 using this calculated anticipated lateral acceleration Gd and the actual lateral acceleration G detected by the newly provided lateral acceleration sensor 34 (see FIG. 1).

$$\delta da = \delta d + K3 \cdot (Gd - G) \qquad \text{(Eq. 25)}$$

The coefficient K3 is a predetermined positive constant. The absolute value of the corrected target turning angle δda is corrected to be increased, in case where the actual lateral acceleration G is less than the anticipated lateral acceleration Gd. Further, the absolute value of the corrected target turning angle δda is corrected to be decreased, in case where the actual lateral acceleration G exceeds the anticipated lateral acceleration Gd. This correction ensures the turning angles of the right and left front wheels FW1 and FW2 necessary for the anticipated lateral acceleration Gd with high precision.

Third Embodiment

Subsequently explained is a third embodiment of the present invention using a turning curvature instead of the lateral acceleration as the motion state quantity in the first embodiment. The third embodiment is constituted in the same manner as the first embodiment as shown in FIG. 1. The computer program executed by the electronic control unit 35 is slightly different from the first embodiment.

Figure 9:
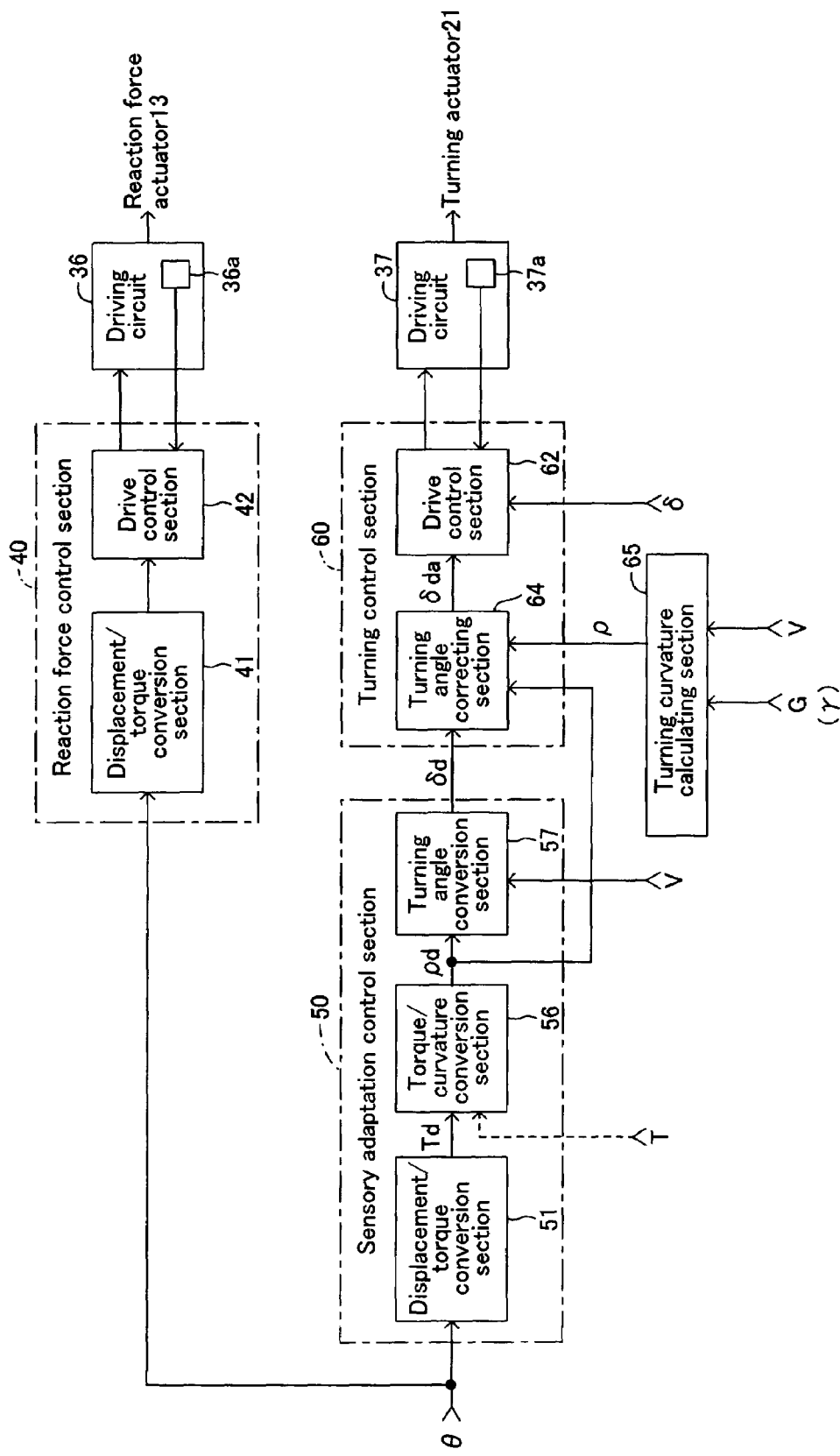
FIG. 9 is a functional block diagram functionally showing a computer program processing executed by an electronic control unit of FIG. 1 according to the third embodiment.

In the third embodiment, the computer program executed by the electronic control unit 35 is shown by a functional block diagram of FIG. 9. In this case, at the sensory adaptation control section 50, the displacement/torque conversion section 51 functions in the same manner as in the first embodiment, and a torque/curvature conversion section 56 is provided instead of the torque/lateral-acceleration conversion section 52 in the first embodiment.

By using the steering torque Td calculated at the displacement/torque conversion section 51, the torque/curvature conversion section 56 sets an anticipated turning curvature ρd anticipated by a driver from the turning operation of the steering handle 11 to "0" as disclosed in the following equation 26, if the absolute value of the steering torque Td is less than the positive small predetermined value To, while it calculates the anticipated turning curvature ρd in accordance with the following equation 27, if the absolute value of the steering torque Td is not less than the positive small predetermined value To.

$$\rho d = 0 \; (|Td| < To) \qquad \text{(Eq. 26)}$$

$$\rho d = C \cdot Td^{K2} \; (To \leq |Td|) \qquad \text{(Eq. 27)}$$

Figure 10:
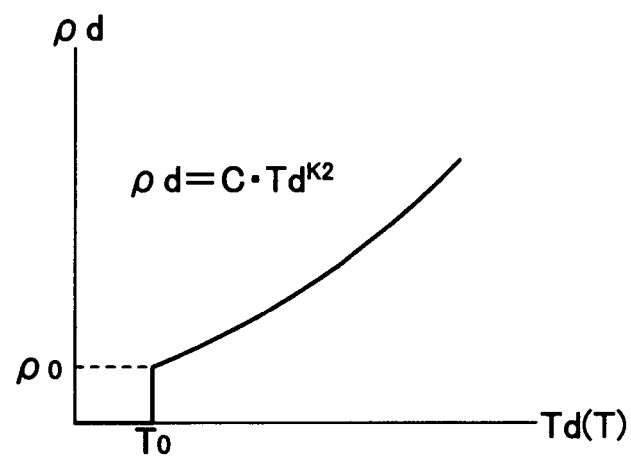
FIG. 10 is a graph showing a relationship between a steering torque and an anticipated turning curvature.

C and K2 in the equation 27 are constants like the first embodiment. The steering torque Td in the equation 27 also represents an absolute value of the steering torque Td calculated by using the equation 2. Therefore, if the calculated steering torque Td is positive, the constant C is made positive, while if the calculated steering torque Td is negative, the constant C is made negative having the absolute value same as the positive constant C. The anticipated turning curvature ρd may also be calculated by using a conversion table having a characteristic shown in FIG. 10 and having stored therein the anticipated turning curvature ρd with respect to the steering torque Td, instead of the calculations of the equations 26 and 27.

Figure 11:
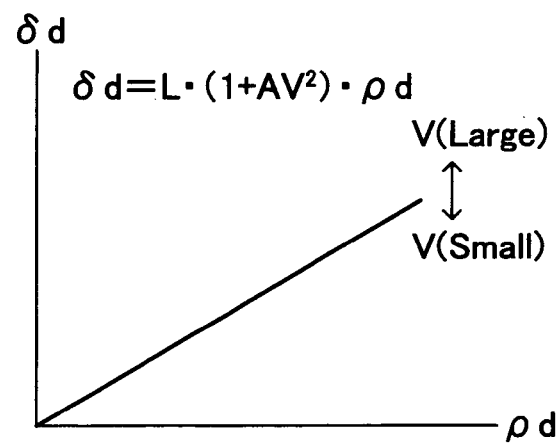
FIG. 11 is a graph showing a relationship between an anticipated turning curvature and a target turning angle.

A turning angle conversion section 57 calculates the target turning angle δd of the right and left front wheels FW1 and FW2 necessary for generating the calculated anticipated turning curvature ρd. As shown in FIG. 11, the turning angle conversion section 57 has a table representing a changing characteristic of the target turning angle δd, which changes according to the vehicle speed V, with respect to the anticipated turning curvature ρd. This table is a set of data collected by running the vehicle as the vehicle speed V is changed and measuring beforehand the turning angle δ of the right and left front wheels FW1 and FW2 and the turning curvature p. The turning angle conversion section 57 refers to this table for calculating the target turning angle δd corresponding to the inputted anticipated turning curvature ρd and the detected vehicle speed V inputted from the vehicle speed sensor 33. Although the turning curvature ρ (anticipated turning curvature ρd) and the target turning angle δd stored in the table are both positive, the outputted target turning angle δd becomes negative if the anticipated turning curvature ρd supplied from the torque/curvature conversion section 56 is negative.

Since the target turning angle δd is a function of the vehicle speed V and the turning curvature ρ as shown in the following equation 28, the target turning angle δd can also be calculated by the computation of the following equation 28, instead of referring to the table.

$$\delta d = L \cdot (1 + A \cdot V^2) \cdot \rho d \qquad \text{(Eq. 28)}$$

In the equation 28, L is a given value (e.g., 2.67 m) determined beforehand showing a wheel base and A is a given value (e.g., 0.00187) determined beforehand.

The calculated target turning angle δd is supplied to a turning angle correcting section 64 of the turning control section 60. The turning angle correcting section 64 inputs the anticipated turning curvature ρd from the torque/curvature conversion section 56 as well as inputs the actual turning curvature ρ from a curvature calculating section 65. The curvature calculating section 65 uses the lateral acceleration G detected by the lateral acceleration sensor 34 or the yaw rate γ detected by the yaw rate sensor 39 and the vehicle speed V detected by the vehicle speed sensor 33 for executing the computation of the following equation 29 in order to calculate the actual turning curvature ρ and outputs the resultant to the turning angle correcting section 64.

$$\rho = G/V^2 \text{ or } \rho = \gamma/V \quad \text{(Eq. 29)}$$

The turning angle correcting section 64 executes the computation of the following equation 30 for correcting the inputted target turning angle δd and calculating the corrected target turning angle δda.

$$\delta da = \delta d + K5 \cdot (\rho d - \rho) \quad \text{(Eq. 30)}$$

The coefficient K5 is a predetermined positive constant. The absolute value of the corrected target turning angle δda is corrected to be increased, in case where the actual turning curvature ρ is less than the anticipated turning curvature ρd. Further, the absolute value of the corrected target turning angle δda is corrected to be decreased, in case where the actual turning curvature ρ exceeds the anticipated turning curvature ρd. This correction ensures the turning angles of the right and left front wheels FW1 and FW2 necessary for the anticipated turning curvature ρd with high precision.

The other program processings executed by the electronic control unit 35 are the same as those in the above-mentioned first embodiment. Therefore, same numerals are given to the components in the functional block diagram of FIG. 9 as those in FIG. 2 in the first embodiment for omitting the detailed explanation thereof.

In this third embodiment too, the steering angle θ as the operation input value by the driver to the steering handle 11 is converted into the steering torque Td at the displacement/torque conversion section 51. The converted steering torque Td is converted into the anticipated turning curvature ρd at the torque/curvature conversion section 56. The right and left front wheels FW1 and FW2 are turned into the corrected target turning angle δda necessary for generating the anticipated turning curvature ρd by the turning angle conversion section 57, the turning angle correcting section 64 and drive control section 62. In this case, the steering torque Td is a physical quantity that can be perceived by the driver from the steering handle 11 due to the action of the reaction force actuator 13. The steering torque Td is also changed in the manner of exponential function with respect to the steering angle θ. Therefore, the driver can turn the steering handle 11 according to the man's perception characteristic, while feeling the reaction force according to the Weber-Fechner's law. Further, the turning curvature generated on the vehicle due to the turning of the right and left front wheels FW1 and FW2 is also a physical quantity that can visually be perceived, and this turning curvature ρ is controlled so as to be equal to the anticipated turning curvature ρd, and this anticipated turning curvature ρd is also changed in the manner of exponentiation function with respect to the steering angle θ. Accordingly, the driver can turn the steering handle 11 according to the man's perception characteristic, while feeling the turning curvature in accordance with the Weber-Fechner's law, thereby being capable of turning the vehicle. As a result, the driver can operate the steering handle 11 for adaptation to the man's perception characteristic, like the first embodiment, thereby being capable of easily driving the vehicle.

Further, the turning angle correcting section 64 corrects the target turning angle δd such that the actual turning curvature ρ actually generated on the vehicle correctly corresponds to the steering angle θ of the steering handle 11, whereby the vehicle turns with the actual turning curvature ρ correctly corresponding to the steering angle θ of the steering handle 11. As a result, the driver can turn the steering handle 11, while sensing the turning curvature correctly adapting to the man's perception characteristic. Therefore, driving the vehicle is more facilitated. Further, the specific effect of the operation is the same as that of the first embodiment except for replacing the lateral acceleration in the first embodiment with the turning curvature.

This third embodiment can be modified to utilize the steering torque T as the operation input value of the steering handle 11, like the aforesaid first embodiment. As shown by a broken line in FIG. 1, this modified example is provided with the steering torque sensor 38 that is attached to the steering input shaft 12 for detecting the steering torque T exerted on the steering handle 11. The displacement/torque conversion section 51 is not provided, and the torque/curvature conversion section 56 calculates the anticipated turning curvature ρd by the execution of the computation of the equations 26 and 27 using the steering torque T detected by the steering torque sensor 38 instead of the steering torque Td calculated by the displacement/torque conversion section 51. In this case too, the anticipated turning curvature ρd may be calculated by using a table representing the characteristic shown in FIG. 10 instead of the execution of the computation of the equations 26 and 27. The other program processings executed by the electronic control unit 35 are the same as those in the third embodiment.

According to this modified example, the steering torque T serving as the operation input value of the driver to the steering handle 11 is converted into the anticipated turning curvature ρd by the torque/curvature conversion section 56, whereby the right and left front wheels FW1 and FW2 are turned into the corrected target turning angle δda necessary for the generation of the anticipated turning curvature ρd by the turning angle conversion section 57, turning angle correcting section 64 and the drive control section 62. In this case too, the steering torque T is a physical quantity that the driver can perceive from the steering handle 11 and the anticipated turning curvature ρd is also changed in the manner of exponentiation function with respect to the steering torque T. Accordingly, the driver can turn the steering handle 11 according to the man's perception characteristic, while feeling the reaction force in accordance with the Weber-Fechner's law. Accordingly, in this modification example too, the driver can turn the steering handle 11 according to the man's perception characteristic, while feeling the turning curvature in accordance with the Weber-Fechner's law, thereby being capable of turning the vehicle, like the third embodiment. Therefore, the same effect as the third embodiment is expected.

Further, the vehicle steering control by the third embodiment and the vehicle steering control by the modified example may be changed over. Specifically, the steering angle sensor 31 and the steering torque sensor 38 are both provided, wherein the change-over can be carried out between the case where the anticipated turning curvature ρd is calculated by using the target steering torque Td calculated at the displacement/torque conversion section 51 like the third embodiment and the case where the anticipated turning curvature ρd is calculated by using the steering torque T detected by the steering torque sensor 38. In this case, the change-over may be changed according to the intention of the driver or may automatically be changed according to the vehicle motion state.

In the aforesaid third embodiment, the turning angle correcting section 64 corrects the target turning angle δd in accordance with the difference ρd−ρ between the anticipated turning curvature ρd and the actual turning curvature ρ. However, instead of this or in addition to this, the turning angle correcting section 61 may correct the target turning angle δd in accordance with the difference Gd−G between the anticipated lateral acceleration Gd and the actual lateral acceleration G, like the first embodiment. In this case, the anticipated lateral acceleration Gd is calculated by the computation of the following equation 31 by using the anticipated turning curvature ρd and the vehicle speed V.

$$Gd = \rho d \cdot V^2 \quad \text{(Eq. 31)}$$

Further, like the second embodiment, the turning angle correcting section 61 may correct the target turning angle δd in accordance with the difference γd−γ between the anticipated yaw rate γd and the actual yaw rate γ. In this case, the anticipated yaw rate γd is calculated by the computation of the following equation 32 by using the anticipated turning curvature ρd and the vehicle speed V.

$$\gamma d = \rho d \cdot V \quad \text{(Eq. 32)}$$

Other Modified Example

The present invention is not limited to the first to third embodiments and their modified examples, and various modifications are possible without departing from the spirit of the present invention.

For example, the steering handle 11 that is turned for steering the vehicle is used in the first to third embodiments and their modified examples. However, instead of this, a steering handle of a joy stick type that linearly displaces may be used, or any other steering handles can be used so long as they are operated by the driver and can instruct the steering to the vehicle.

In the first to third embodiments and their modified examples, the turning output shaft 22 is rotated by using the turning actuator 21, thereby turning the right and left front wheels FW1 and FW2. However, instead of this, the right and left front wheels FW1 and FW2 may be turned by linearly displacing the rack bar 24 by using the turning actuator 13.

Moreover, in the first and second embodiments and their modified examples, a lateral acceleration, yaw rate or turning curvature is independently used as a vehicle motion state quantity that a man can perceive. However, the vehicle motion state quantity is changed over by a selecting operation by a driver or is automatically changed over according to the vehicle running state, to thereby perform a vehicle steering control. In the case of automatically changing over according to the vehicle running state, a turning curvature may be used as the motion state quantity when a vehicle runs with a low speed (e.g., less than 40 Km/h), a yaw rate may be used as the motion state quantity when a vehicle runs with a medium speed (e.g., not less than 40 Km/h and less than 100 Km/h), and a lateral acceleration may be used as a motion state quantity when a vehicle runs with a high speed (e.g., not less than 100 Km/h). This achieves an appropriate vehicle steering control according to a vehicle speed. Therefore, driving a vehicle is more facilitated.

What is claimed is:

1. A vehicle steering apparatus of a steer-by-wire system provided with a steering handle operated by a driver for steering a vehicle, a turning actuator for turning steered wheels and a turning control device that drives and controls the turning actuator according to the operation on the steering handle for turning the steered wheels, wherein the turning control device comprises:

operation input value detecting means that detects an operation input value by a driver to the steering handle;

motion state quantity calculating means that calculates an anticipated motion state quantity of the vehicle by using the detected operation input value, wherein the anticipated motion state quantity of the vehicle represents the vehicle motion state, that relates to a turn of the vehicle and can be sensed by a driver, and are in the predetermined relation of exponential function or in the predetermined relation of exponentiation function with the operation input value to the steering handle;

turning angle calculating means that calculates a turning angle of the steered wheels necessary for the vehicle to move with the calculated anticipated motion state quantity calculated by the motion state quantity calculating means by using the calculated anticipated motion state quantity; and turning control means that controls the turning actuator according to the calculated turning angle for turning the steered wheels into the calculated turning angle.

2. A vehicle steering apparatus of a steer-by-wire system according to claim 1, wherein the operation input value detecting means is composed of a displacement amount sensor that detects a displacement amount of the steering handle, and the motion state quantity calculating means is composed of operation force conversion means that converts the detected displacement amount into the operation force exerted on the steering handle and motion state quantity conversion means that converts the converted operation force into the anticipated motion state quantity.

3. A vehicle steering apparatus of a steer-by-wire system according to claim 2, wherein the operation force conversion means converts the detected displacement amount into the operation force applied to the steering handle by using an exponential function, and the motion state quantity conversion means converts the converted operation force into the anticipated motion state quantity by using an exponentiation function.

4. A vehicle steering apparatus of a steer-by-wire system according to claim 3, wherein the motion state quantity conversion means sets the anticipated motion state quantity to "0" when the converted operation force is less than a predetermined value, and converts the converted operation force into the anticipated motion state quantity by using the exponentiation function when the converted operation force is not less than the predetermined value.

5. A vehicle steering apparatus of a steer-by-wire system according to claim 4, wherein the operation force conversion means sets the operation force applied to the steering handle to the predetermined value when the detected displacement amount is "0".

6. A vehicle steering apparatus of a steer-by-wire system according to claim 2, wherein
the displacement amount of the steering handle is a steering angle of the steering handle.

7. A vehicle steering apparatus of a steer-by-wire system according to claim 1, wherein
the operation input value detecting means is composed of an operation force sensor that detects the operation force applied to the steering handle, and
the motion state quantity calculating means is composed of motion state quantity conversion means that converts the detected operation force into the anticipated motion state quantity.

8. A vehicle steering apparatus of a steer-by-wire system according to claim 7, wherein
the motion state quantity conversion means converts the detected operation force into the anticipated motion state quantity by using an exponentiation function.

9. A vehicle steering apparatus of a steer-by-wire system according to claim 8, wherein
the motion state quantity conversion means sets the anticipated motion state quantity to "0" when the detected operation force is less than a predetermined value, and converts the detected operation force into the anticipated motion state quantity by using the exponentiation function when the detected operation force is not less than the predetermined value.

10. A vehicle steering apparatus of a steer-by-wire system according to claim 7, wherein
the operation force applied to the steering handle is a steering torque.

11. A vehicle steering apparatus of a steer-by-wire system according to claim 1, further comprising:
motion state quantity detecting means that detects an actual motion state quantity that corresponds to the calculated anticipated motion state quantity and represents the vehicle actual motion state; and
correcting means that corrects the calculated turning angle according to the difference between the calculated anticipated motion state quantity and the detected actual motion state quantity.

12. A vehicle steering apparatus of a steer-by-wire system according to claim 1, wherein
the anticipated motion state quantity is one of a vehicle lateral acceleration, vehicle yaw rate, and vehicle turning curvature.

13. A vehicle steering apparatus of a steer-by-wire system according to claim 1, wherein
the motion state quantity detecting means selectively utilizes any one of anticipated motion state quantities of plural types as the anticipated motion state quantity.

14. A vehicle steering apparatus of a steer-by-wire system according to claim 1, further comprising:
a reaction force device that applies a reaction force to the operation of the steering handle.

15. A vehicle steering apparatus of a steer-by-wire system according to claim 14, wherein
the reaction force device applies the reaction force, which is obtained by converting the displacement amount of the steering handle in the manner of exponential function, to the steering handle.

* * * * *

UNITED STATES PATENT AND TRADEMARK OFFICE
CERTIFICATE OF CORRECTION

| | |
|---|---|
| PATENT NO. | : 7,581,616 B2 |
| APPLICATION NO. | : 10/585670 |
| DATED | : September 1, 2009 |
| INVENTOR(S) | : Takeshi Goto et al. |

It is certified that error appears in the above-identified patent and that said Letters Patent is hereby corrected as shown below:

Title page,
Item [73], Assignee, change "Toyota Jidosha Kobushiki Kaisha", to --Toyota Jidosha Kabushiki Kaisha--

Signed and Sealed this

Twentieth Day of April, 2010

David J. Kappos
*Director of the United States Patent and Trademark Office*